United States Patent Office 3,305,070
Patented Feb. 21, 1967

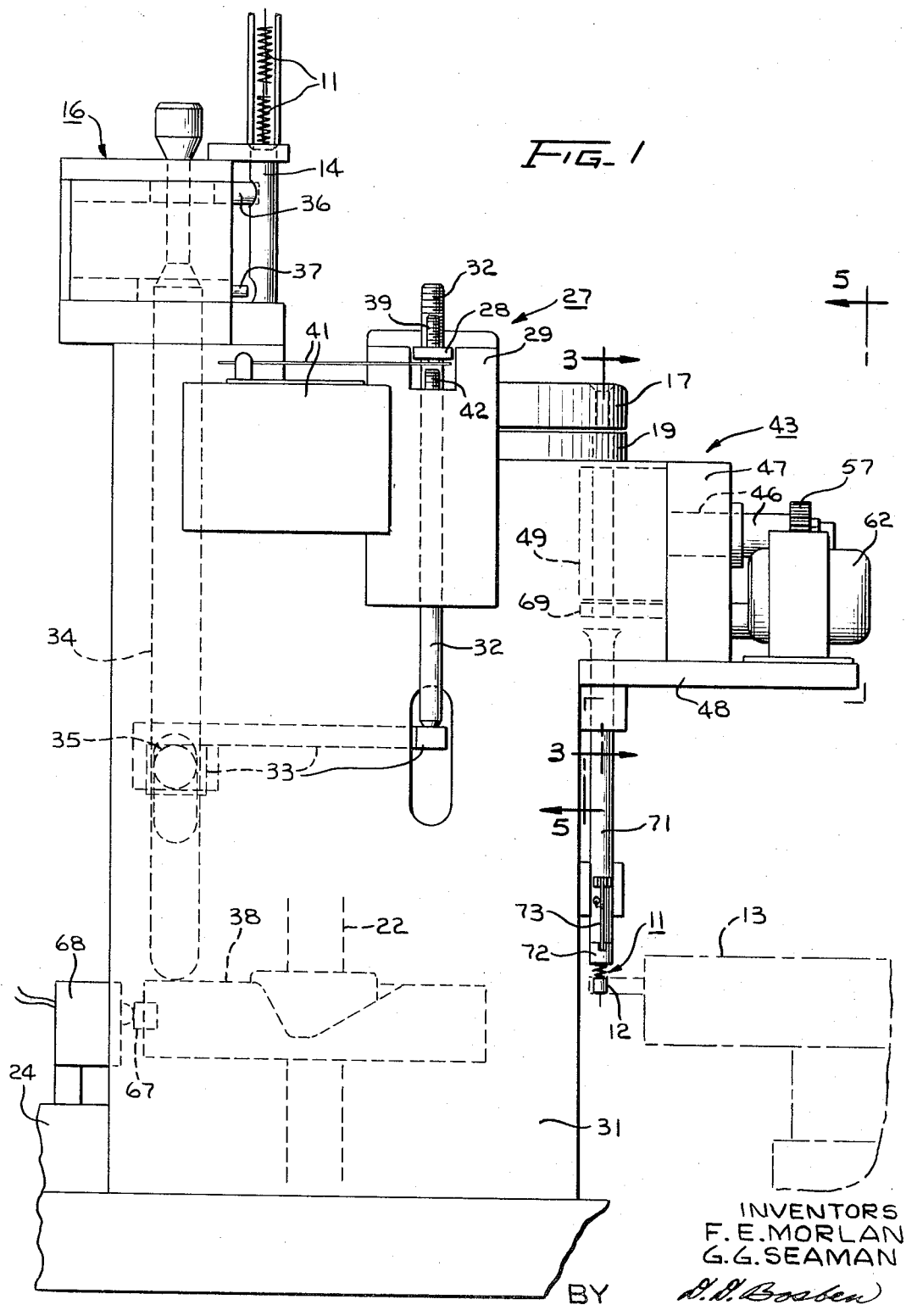

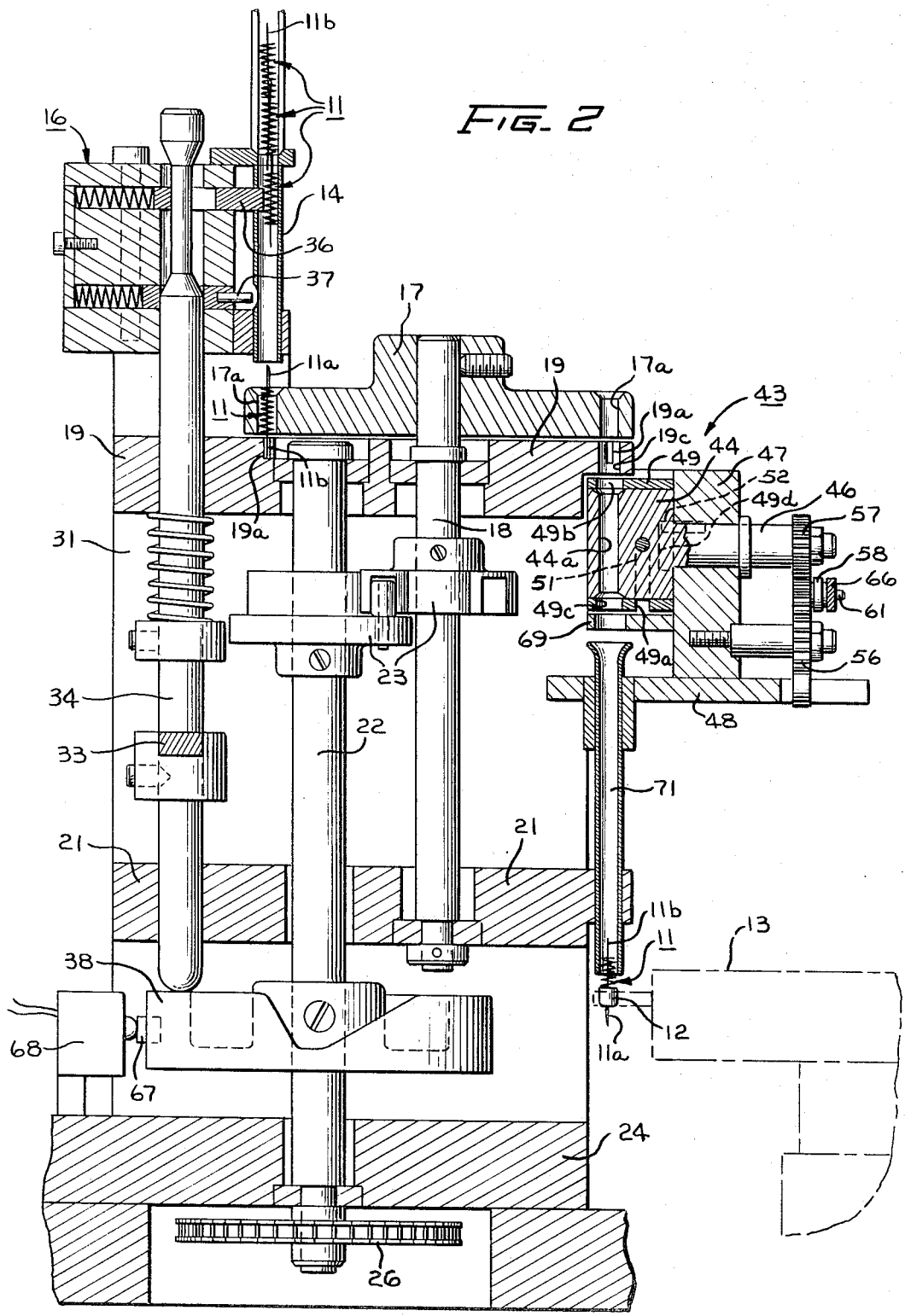

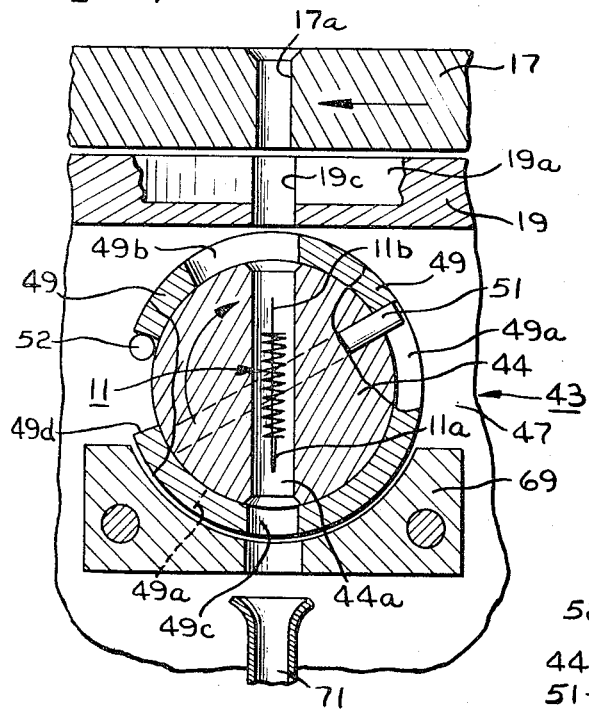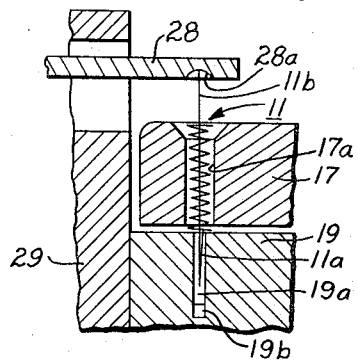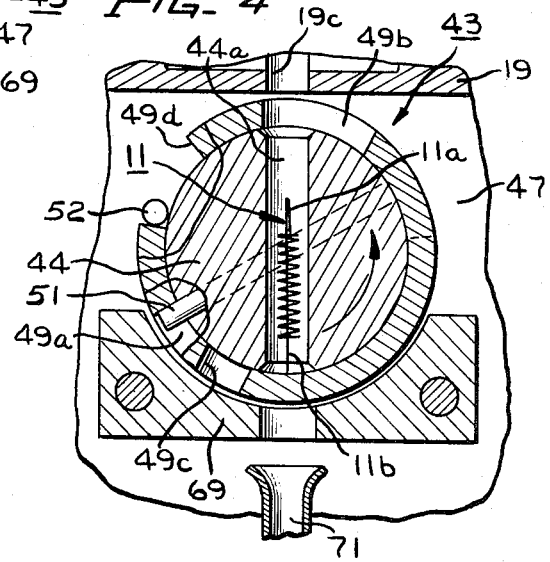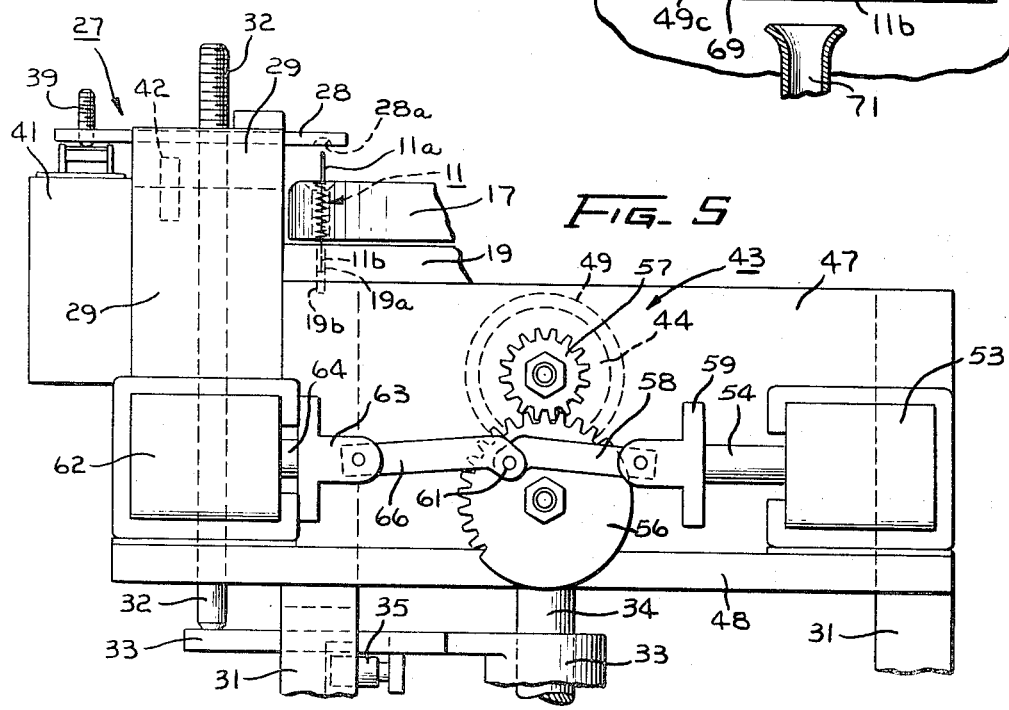

3,305,070
APPARATUS FOR ORIENTING ARTICLES
Floyd E. Morlan and Gary G. Seaman, Omaha, Nebr., assignors to Western Electric Company, Incorporated, New York, N.Y., a corporation of New York
Filed June 7, 1965, Ser. No. 461,827
5 Claims. (Cl. 198—33)

This invention relates to apparatus for orienting articles, and more particularly to apparatus for orienting articles being fed along a predetermined path to an orienting device in either an oriented or a misoriented condition. It is an object of this invention to provide new and improved apparatus of this character.

In numerous manufacturing operations it is necessary that articles be presented to a processing station in a preselected orientation in order for the articles to be processed properly. Generally, this is accomplished by feeding the articles in random fashion to an orienting device from which the articles are delivered in a uniformly oriented relationship. The oriented articles then are fed to the processing station.

In the past, various types of orienting apparatus have been proposed for the orienting of articles from a random relationship into a uniformly oriented relationship. For example, in one type of apparatus an article is fed to an orienting device and the orientation of the article is sensed while it is in the orienting device. If the article is properly oriented the orienting device releases the article, but if the article is improperly oriented, the orienting device orients the article before releasing it. In another type of apparatus, orientation of an article is sensed before it arrives at an orienting device, and the apparatus is conditioned for operating the orienting device in one of two modes, depending upon the orientation of the article. Subsequently, the article is fed into the orienting device and the orienting device is operated in the mode for which the apparatus was conditioned, to orient the article, whereupon the orienting device releases the article.

The above-described types of prior known apparatus have various disadvantages. For example, in certain instances the apparatus must proceed through an excessive number, and a relatively complicated sequence, of operating steps. In some cases this is true even where the article being processed already is properly oriented. In other instances the apparatus must pass through a reset cycle after orienting a misoriented article, and in some cases, even after processing an already properly oriented article. The net result is an operating cycle which is relatively complicated and relatively long in duration.

Accordingly, another object of this invention is to provide new and improved article orienting apparatus which has a simplified cycle of operation as compared to prior known apparatus.

A further object of this invention is to provide new and improved article orienting apparatus which has a faster operating cycle time as compared to prior known apparatus.

A still further object of this invention is to provide new and improved article orienting apparatus which requires no resetting step after orienting a misoriented article.

Another object of this invention is to provide new and improved article orienting apparatus in which a properly oriented article feeds directly through an orienting device.

A further object of this invention is to provide new and improved article orienting apparatus for orienting articles being fed along a predetermined path to an orienting device in either an oriented or a misoriented condition.

In accordance with the invention, apparatus for orienting articles includes an article orienting device to which the articles are fed along a predetermined path. Before an article arrives at the orienting device, the orientation of the article is sensed to determine whether it is oriented or misoriented. If the article is properly oriented it subsequently feeds directly through the orienting device. If the article is misoriented the orienting device is conditioned so that the misoriented article can enter the orienting device but cannot pass therethrough. After the misoriented article has been received in the conditioned orienting device, the orienting device is returned to its original state to orient the article and to release the article.

In a preferred embodiment of the invention, apparatus for orienting articles includes an orienting device to which the articles are fed along a predetermined path and the orienting device includes a rotatable cylinder and a rotatable sleeve member encircling the cylinder. Before an article arrives at the cylinder and the sleeve member of the orienting device, the orientation of the article is sensed to determine whether it is properly oriented or misoriented. If the article is properly oriented, the cylinder and the sleeve member remain in first relative positions, and the article subsequently feeds directly through openings in the sleeve member and a bore through the cylinder. If the article is misoriented, the cylinder is rotated in a first direction to condition the orienting device for receiving the article. In this regard, a pin and slot mechanism subsequently limits the rotation of the cylinder relative to the sleeve member, and then causes rotation of the sleeve member with the cylinder, so that the cylinder and the sleeve member move from their first relative positions into second relative positions in which the misoriented article can feed through one of the openings in the sleeve member into the bore in the cylinder, but is prevented from feeding through the cylinder by the sleeve member. The cylinder then is rotated in the opposite direction, and again the pin and slot mechanism limits rotation of the cylinder relative to the sleeve member, and then causes rotation of the sleeve member with the cylinder, to move the cylinder and the sleeve member back to their first relative positions, thereby to orient the article and to permit the article to feed from the bore in the cylinder through the other opening in the sleeve member.

This invention, together with further objects and advantages thereof, will best be understood by reference to the following detailed description taken in connection with the accompanying drawings, in which:

FIG. 1 is a side elevation view of the apparatus;

FIG. 2 is an enlarged cross-sectional view of the apparatus as shown in FIG. 1, taken substantially along the centerline of the apparatus;

FIG. 3 is a further enlarged partial cross-sectional view of the apparatus taken along the line 3—3 of FIG. 1 and showing the apparatus in a first operating condition;

FIG. 4 is a cross-sectional view, similar to FIG. 3, and showing the apparatus in a second operating condition;

FIG. 5 is an enlarged partial front elevational view of the apparatus taken substantially along the line 5—5 of FIG. 1; and FIG. 6 is a further enlarged cross-sectional view of a part of the apparatus, as seen in FIG. 5, illustrating an operating phase thereof.

Referring to FIGS. 1 and 2 of the drawing, it is seen that the illustrated embodiment of the invention is designed to orient and to feed coil-type springs 11 into tubular cap members 12 (only one shown) supported on an indexing table 13. Subsequently, the coil springs 11 and the cap members 12 are subjected to additional processing and are combined with other parts in operations forming no part of this invention to form electrical fuse assemblies used extensively in telephone switching systems.

Each of the springs 11 is a partially coiled wire which, at one end of its coils, extends radially inward and then at a right angle axially of the coils, and which is reversed on itself to form a projection 11a. From the reversed projection 11a the wire extends through the coils axially so that a free end 11b of the wire projects beyond the other end of the coils. Each spring 11 is fed into an associated one of the cap members 12 so that its free end 11b is in an upward position and its reversed projection 11a extends downward through an aperture in the cap member.

Referring to the left-hand side of FIGS. 1 and 2, the coil springs 11 are fed down a vertical guide chute 14 from a vibratory feeder (not shown) to an escapement mechanism 16 in random relationship, that is, with either their reversed projections 11a, or their free ends 11b, extending upward. As is best shown in FIG. 2, the escapement mechanism 16 releases the springs 11 one at a time to an indexing table 17 secured to the upper end of a vertical shaft 18 journalled adjacent its upper and lower ends in horizontal upper and intermediate frame plates 19 and 21, respectively. A released spring 11 drops into one of a plurality of vertical apertures 17a in the indexing table 17 and so that either its reverse projection 11a or its free end 11b, depending upon the orientation of the spring, is received in a circular groove 19a in the upper side of the upper frame plate 19, with the lowermost coil of the spring supported on the top surface of the upper frame plate. Preferably, this feeding of the springs 11 is accomplished by the method and apparatus, of which apparatus the escapement mechanism 16 forms a part, as disclosed in the copending application Serial No. 453,603, filed May 6, 1965, by G. G. Seaman, and assigned to the same assignee.

The indexing table 17 is indexed in 90° increments by a vertical drive shaft 22 through a Geneva wheel mechanism 23. The drive shaft 22 is journalled for rotation adjacent its upper and lower ends in the upper frame plate 19 and a lower frame plate 24, respectively, and has a drive sprocket 26 secured thereto adjacent its lower end and suitably connected to a power source, not shown.

After one of the coil springs 11 is received in one of the apertures 17a in the indexing table 17, the indexing table is rotated 90° by the Geneva wheel mechanism 23 to position the spring adjacent a sensing mechanism 27 (FIGS. 1 and 5) for sensing the orientation of the spring, with either the reversed projection 11a or the free end 11b of the spring, as the case may be, riding in the circular groove 19a in the upper frame plate 19. More specifically, as is shown in FIG. 5, the indexing of the indexing table 17 positions the spring 11 vertically beneath one end of a horizontal sensing bar 28 of the sensing mechanism 27. The sensing bar 28, intermediate its ends, extends through a horizontal guide slot in the top of a guide block 29 mounted on an adjacent one of a pair of laterally spaced side frame members 31, and is screw threadably mounted on an upper end portion of a lifting rod 32 slidable vertically in the guide block.

The lower end of the vertical lifting rod 32 rests upon an end portion of a first leg of a horizontally disposed lifting arm 33. The first leg of the lifting arm 33 extends through a vertical slot in the adjacent side frame member 31 into the interior of the apparatus, and at its inner end is integral with one end of a second leg of the arm disposed at a right angle to the first leg and extending adjacent the side frame member parallel thereto. At its other end the second leg of the lifting arm 33 is integral with a laterally projecting connector portion of the arm, which, as is shown in FIGS. 1, 2 and 5, is adjustably secured to a vertical plunger 34 which is slidable vertically in the upper frame plate 19 and the intermediate frame plate 21. A guide roller 35 (FIGS. 1 and 5) is mounted on a depending lug on the second leg of the lifting arm 33 and is engageable in a vertical groove in the adjacent side frame member 31, for preventing rotation of the lifting arm and the plunger 34 about the plunger's vertical axis. The plunger 34, in addition to operating the sensing mechanism 27, is designed adjacent its upper end to form a part of the escapement mechanism 16, for operating upper and lower spring-biased stop members 36 and 37 of the escapement mechanism.

The plunger 34 is spring-biased downward and is movable vertically upward by a cam 38 engaged with its lower end and secured to the vertical drive shaft 22. When the cam 38 moves the plunger 34 vertically upward to the position shown in FIGS. 1 and 2, the lifting arm 33 moves with the plunger and moves the lifting rod 32 and the horizontal sensing bar 28 vertically upward, to permit one of the coil springs 11 to be moved under the sensing bar by the indexing table 17, as above described. When the cam 38 permits the spring-biased plunger 34 to move vertically downward the lifting arm 33 moves downward with the plunger and permits the lifting rod 32 and the sensing bar 28 to drop vertically downward by gravity so that a dished portion 28a (FIG. 5) in the underside of the sensing bar engages and centers the reversed portion 11a of the spring 11, or the free end 11b of the spring, depending on the orientation of the spring.

The nature of each coil spring 11 is such that if it is properly oriented, that is, with its free end 11b in an uppermost position, it will not be compressed by the sensing bar 28 and the spring acts as a stop to limit the bar's downward movement. More specifically, referring to FIG. 6, it is seen that when the spring 11 is properly oriented, so that the lowermost end coil thereof which is supported on the upper frame plate 19 is the end coil which is rigidly integral with its reversed projection 11a, as the sensing bar 28 moves downward to sense the orientation of the spring it engages the upwardly extending free end 11b of the spring and exerts a downward force thereon which is transmitted to the spring's lowermost end coil, and thus to the upper frame plate, through the axially extending portion and the reversed projection 11a of the spring. Thus, since the axially extending portion, the reversed projection 11a and the lowermost end coil of the spring 11 all are rigidly integral with one another, and since no compressive force is being exerted between the two end coils of the spring, the coils of the spring are not compressed by the sensing bar 28 and the sensing bar is precluded from further downward movement.

However, if the spring 11 is inverted as shown in FIG. 5, so that it is supported on the upper frame plate 19 by its end coil which is adjacent its free end 11b and so that the reversed projection 11a thereof is extending upward and engageable by the sensing bar 28, the force exerted on the reversed projection by the sensing bar is transmitted to the lowermost end coil, and thus to the upper frame plate, through the reversed projection, the uppermost coil and the intermediate coils of the spring. Thus, the coils of the spring 11 are compressed by the sensing bar 28, with the free end 11b of the spring being received in a suitable bore 19b (FIG. 5) in the upper frame plate 19 during the compressing operation, and the sensing bar moves further downward after engagement with the reversed projection 11a so that an actuating member 39 screw threadably mounted in an outer end portion thereof engages and operates a limit switch 41 mounted on the guide block 29. This latter downward movement of the sensing bar 28 is limited by its engaging a stop member 42 which is screw threaded into the guide block.

As is best shown in FIGS. 2, 3 and 4, the apparatus includes an orienting device 43 through which the coil springs 11 are fed, and which, when one of the springs is misoriented, is conditioned for receiving and orienting the spring. The orienting device 43 includes a spring inverting cylinder 44 which has a spring-receiving bore 44a therethrough, and which includes an integral support shaft 46 journalled in a vertical support block 47. The support block 47 is mounted on a horizontal platform 48 secured at its opposite sides to the side frame members 31.

A rotatable sleeve member 49 encircles the cylinder 44, and the cylinder is rotatable relative to the sleeve member within limits defined by a relatively long, circumferentially extending slot 49a in the sleeve member and a pin 51 extending transversely through the cylinder and projecting at one end into the slot. The sleeve member 49 also is provided with a relatively short, circumferentially extending second slot 49b through which the coil springs 11 enter the bore 44a of the cylinder, and with an aperture 49c which is normally in alignment with the bore, as shown in FIG. 3, and which allows the springs to feed out of the bore. The sleeve member 49 is rotatable with the cylinder 44 within limits defined by a stop pin 52 force-fitted into the support block 47 and projecting into a third slot 49d in the side of the sleeve member 49 adjacent the support block.

When the sensing mechanism 27 detects that one of the coil springs 11 is misoriented, the orienting device 43 is conditioned for receiving the misoriented spring by the cylinder 44 and the sleeve member 49 being rotated from relative positions as shown in FIG. 3 to relative positions as shown in FIG. 4. For this purpose, a conditioning solenoid 53 (FIG. 5) is mounted adjacent one side of the horizontal platform 48 and has an armature 54 thereof connected to a toothed drive gear 56 which is journalled for rotation on the support block 47 and which is meshed with a second toothed gear 57 secured to an outer end of the cylinder shaft 46. The connection of the armature 54 to the drive gear 56 includes a link 58 which is pivoted adjacent one end to a bifurcated member 59 mounted on an outer end of the armature, the link 58 being pivoted adjacent its other end on a projecting portion of a pin 61 force-fitted into the drive gear. Similarly, an orienting solenoid 62 is mounted adjacent the opposite side of the platform 48 with a bifurcated member 63 on an armature 64 of the solenoid connected to the pin 61 on the drive gear 56 by a pivoted link 66. The gear tooth ratio of the gears 56 and 57 in the illustrated embodiment of the invention is two-to-one and the solenoids 53 and 62, when energized, rotate the drive gear 56 through 90°, thereby causing rotation of the gear 57, and thus the cylinder 44, through 180°.

When the sensing bar 28 compresses the misoriented spring 11 and actuates the limit switch 41 as above described, the limit switch connects the conditioning solenoid 53 to a suitable power supply (not shown) to energize the solenoid. Energization of the solenoid 53 causes its armature 54 to be moved to a retracted position to the right, as viewed in FIG. 5, so that the armature, through the pivoted link 58 and the gears 56 and 57, rotates the cylinder 44 clockwise, as viewed in FIG. 3 through 180° into the position shown in FIG. 4. As the cylinder 44 is rotated it initially moves relative to the sleeve member 49. Subsequently, however, the pin 51 engages a first end of the slot 49a in the sleeve member 49 to cause movement of the sleeve member with the cylinder through the latter portion of its movement. As is shown in FIG. 4, as a result of the cylinder 44 moving relative to the sleeve member 49 and the sleeve member then moving with the cylinder, the spring receiving bore 44a through the cylinder now is closed off at its lowermost end by the sleeve member. The uppermost end of the bore 44a, however, as a result of the second slot 49b in the sleeve member 49 being elongated, is still open for receiving the misoriented spring 11 into the bore.

After the orienting device 43 has been conditioned for receiving the misoriented spring 11, the plunger 34 is raised vertically by the cam 38 back to its uppermost position, as shown in FIGS. 1 and 2. This movement of the plunger 34, through the lifting arm 33 and the lifting rod 32, raises the sensing bar 28 to disengage it from the misoriented spring 11 and so that it permits the limit switch 41 to open to deenergize the conditioning solenoid 53. At the same time, the upper end portion of the plunger 34 operates the escapement mechanism 16 so that it releases a next spring 11 to the indexing table 17. The indexing table 17 then is indexed another 90° increment by the drive shaft 22 and the Geneva wheel mechanism 23, to position the next spring 11 adjacent the sensing mechanism 27, and to position the misoriented spring 11 above the inverting cylinder 44. The misoriented spring 11 then drops from the indexing table 17 downward through an aperture 19c in the upper frame plate 19 and through the sleeve member slot 49b into the bore 44a of the inverting cylinder 44, as shown in FIG. 4.

Referring to the lower left-hand side of FIG. 2, it is seen that after the misoriented spring 11 has been received in the orienting device 43 a camming element 67 on the cam 38 closes a limit switch 68 mounted on the lower frame plate 24 to energize the orienting solenoid 62. Energization of the solenoid 62 causes its armature 64, which was pulled from a retracted position, as shown in solid lines in FIG. 5, to the right in this figure to an advanced position upon energization of the first solenoid 53, to be moved back to its retracted position. Thus, the armature 64, through the pivoted link 66 and the gears 56 and 57, rotates the inverting cylinder 44 through 180° counterclockwise, as viewed in FIG. 4, back to the position shown in FIG. 3, thereby inverting the misoriented spring 11. As the cylinder 44 rotates it again initially moves relative to the sleeve member 49, and subsequently the pin 51 engages a second end of the slot 49a to move the sleeve member with the cylinder, so that when the cylinder reaches its original position in FIG. 3, the aperture 49c through the sleeve member is again in alignment with the cylinder bore 44a. The now oriented spring 11 then drops through the aperture 49c, an apertured guide member 69 secured to the support block 47, and into a feed tube 71 to one of the cap members 12 on the indexing table 13. Subsequently, the camming element 67 on the cam 38 permits the limit switch 68 to open to deenergize the solenoid 62.

When the sensing mechanism 27 detects a properly oriented coil spring 11, since the limit switch 41 is not operated by the sensing bar 28, the conditioning solenoid 53 is not operated and the spring inverting cylinder 44 and the sleeve member 49 remain in their relative positions as shown in FIG. 3. Accordingly, when the properly oriented spring 11 is positioned above the cylinder 44 by indexing of the indexing table 17, as described above for a misoriented spring, the properly oriented spring drops directly through the upper frame plate aperture 19c, the sleeve member slot 49b, the cylinder bore 44a, the sleeve member aperture 49c and the apertured guide member 69, into the feed tube 71 and to the cap member 12 therebeneath. When the orienting solenoid 62 subsequently is operated by the closing of the limit switch 68, since the solenoid's armature 64 is still in its retracted position as shown in FIG. 5, the operation of the solenoid has no effect on the cylinder 44 and the sleeve member 49.

The feed tube 71 is fixedly supported adjacent its upper end in the horizontal platform 48, and adjacent its lower end in the intermediate frame plate 21. Referring to FIG. 1, it is seen that the feed tube 71 also is provided with a door portion 72 adjacent its lower end, the door portion being swingable to an open position by each of the coil springs 11 as the indexing table 13 is indexed to move the coil spring and the cap member 12 in which it is seated to a subsequent station, thereby to permit movement of the spring laterally out of the feed tube without damaging the spring. The door portion 72 is mounted on the feed tube 71 by a vertically disposed arm 73 in a vertically slotted portion of the intermediate frame plate 21, the arm having a lower end thereof fixedly secured to the door portion and an upper end thereof pivoted to the feed tube, with the arm and the door portion being spring biased to a closed position.

In this connection, a preferred method and apparatus for seating the coil spring 11 in the cap members 12, of which apparatus the feed tube 71 forms a part, is disclosed in the copending application Serial No. 388,838, filed August 11, 1964, now Patent No. 3,248,789, by G. G. Seaman, and assigned to the same assignee.

In operation, referring to the left-hand side of FIGS. 1 and 2, the coil springs 11 are fed down the guide chute 14 from the vibratory feeder (not shown) in either a misoriented position (reversed projection 11a extending upward) or a properly oriented position (free end 11b extending upward), to the escapement mechanism 16. As the cam 38 moves the plunger 34 vertically upward to its position as shown in FIGS. 1 and 2, the upper end portion of the plunger permits the spring-biased upper stop member 36 of the escapement mechanism 16 to move to an advanced position into engagement with the next to the lowermost coil spring 11 in the guide chute 14 to prevent this spring and the springs above it from dropping downward. The plunger 34 then cams the lower stop member 37 to a retracted position so that the lowermost coil spring 11, which is being retained thereby, is released to the indexing table 17. The upward movement of the plunger 34, through the lifting arm 33 and the lifting rod 32 of the sensing mechanism 27, also moves the sensing bar 28 of the sensing mechanism into its uppermost position for subsequently receiving the released coil spring 11 therebeneath.

The released coil spring 11 drops into one of the aperture 17a in the indexing table 17, with the spring's reversed projection 11a or free end 11b, depending upon whether the spring is misoriented or oriented, respectively, extending into the circular groove 19a in the upper frame plate 19, and with the lowermost coil of the spring resting on the top of the frame plate. The indexing table 17 and its support shaft 18 then are indexed 90° by the drive shaft 22 and the Geneva wheel mechanism 23, to position the spring beneath the sensing bar 28, as shown in FIG. 5. During this indexing operation, the spring's reversed projection 11a or free end 11b, as the case may be, travels in the circular upper frame plate groove 19a.

The cam 38 then permits the spring-biased plunger 34 and the lifting arm 33 thereon to move vertically downward and the lifting rod 32 and the sensing bar 28 move downward by gravity so that the dished portion 28a of the sensing bar engages and centers the reversed projection 11a of the coil spring 11 if it is misoriented, or its free end 11b if it is properly oriented. Further, as the plunger 34 moves downward its upper end portion permits the spring-biased lower stop member 37 of the escapement mechanism 16 to move to an advanced position, and then cams the upper stop member 36 to a retracted position to permit the column of coil springs 11 in the guide chute 14 to drop downward into engagement with the lower stop member.

If the coil spring 11 is misoriented and the sensing bar 28 engages the spring's reversed projection 11a, the coils of the spring are compressed by the bar and the bar continues to move downward into engagement with the stop 42 and so that the actuating member 39 on the bar closes the limit switch 41. The closing of the limit switch 41 energizes the conditioning solenoid 53 and causes its armature 54 to be moved to the right, as viewed in FIG. 5, so that the armature, through the pivoted link 58 and the gears 56 and 57, conditions the orienting device 43 by rotating the spring inverting cylinder 44 clockwise, as viewed in FIG. 3, through 180° to the position shown in FIG. 4. As the cylinder 44 rotates it initially moves relative to the sleeve member 49, and subsequently the pin 51 engages the above-mentioned first end of the slot 49a in the sleeve member to cause rotation of the sleeve member with the cylinder so that they assume their relative positions as shown in FIG. 4, in which the lower end of the cylinder bore 44a is closed off by the sleeve member. In this regard, overtravel of the sleeve member 49 relative to the cylinder 44 is prevented by the stop pin 52 in the sleeve member slot 49d.

The plunger 34 then is raised again by its operating cam 38 into its uppermost position, as shown in FIGS. 1 and 2, to operate the escapement mechanism 16 to release the next coil spring 11 to the indexing table 17, and to raise the sensing bar 28 so that it disengages from the misoriented spring 11 and so that it permits the limit switch 41 to open to deenergize the conditioning solenoid 53. The indexing table 17 then is indexed another 90° by the drive shaft 22 and the Geneva wheel mechanism 23, to position the just released coil spring 11 adjacent the sensing mechanism 27, and to position the misoriented spring 11 above the cylinder 44, whereupon the misoriented spring drops through the upper frame plate aperture 19c and the sleeve member slot 49b into the cylinder bore 44a, as shown in FIG. 4.

Referring to the lower left-hand corner of FIG. 2, the camming element 67 on the cam 38 then closes the limit switch 68 to energize the orienting solenoid 62. Energization of the solenoid 62 causes its armature 64, which was pulled to its advanced position to the right in FIG. 5, upon energization of the first solenoid 53, to be moved back to its retracted position as shown in this figure. Thus, the armature 64, through the link 66 and the gears 56 and 57, rotates the cylinder 44 counterclockwise, as viewed in FIG. 4, through 180° back to the position shown in FIG. 3, to invert the misoriented spring 11. Again, the cylinder 44 initially rotates relative to the sleeve member 49 and subsequently the pin 51 engages the above-mentioned second end of the sleeve member slot 49a to move the sleeve member with the cylinder back into their relative positions as shown in FIG. 3, with the stop pin 52 in the sleeve member slot 49d preventing overtravel of the sleeve member relative to the cylinder. Upon the cylinder 44 and the sleeve member 49 reaching their relative positions as shown in FIG. 3, the now oriented coil spring 11 drops out of the cylinder bore 44a through the sleeve member aperture 49c, the apertured guide member 69, and into the feed tube 71 to one of the cap members 12 on the indexing table 13.

When one of the coil springs 11 is properly oriented so that the sensing bar 28 of the sensing mechanism 27 engages the free end 11b of the spring, as shown in FIG. 6, the coils of the spring are not compressed by the sensing bar and the spring limits the bar's downward movement so that the limit switch 41 is not operated. Thus, the conditioning solenoid 53 is not energized and the cylinder 44 and the sleeve member 49 remain in their relative positions as shown in FIG. 3. Accordingly, when the properly oriented spring 11 is positioned above the cylinder 44 by indexing of the indexing table 17, referring to FIG. 3, it is seen that the properly oriented spring drops directly through the upper frame plate aperture 19c, the sleeve member slot 49b, the cylinder bore 44a, the sleeve member aperture 49c, the apertured guide member 69, and into the feed tube 71 to one of the cap members 12. When the orienting solenoid 62 subsequently is energized by the camming element 67 closing the limit switch 68, since the solenoid's armature 64 already is in its retracted position, the operation of the solenoid has no effect on the cylinder 44 and the sleeve member 49.

After one of the coil springs 11 has been received in the cap member 12 beneath the feed tube 71, the indexing table 13 indexes to move the assembled spring and cap member to a subsequent station and to position a next cap member 12 beneath the feed tube. As the assembled spring 11 and cap member 12 are moved from beneath the feed tube 71, the spring moves the spring-biased door portion 72 to its open position to permit movement of the spring laterally out of the feed tube without damaging the spring, after which the door portion recloses.

While one embodiment of the invention has been disclosed, many modifications will be apparent and it is intended that the invention be interpreted as including all modifications which fall within the true spirit and scope of the invention.

What is claimed is:

1. Apparatus for orienting articles, which comprises:
an orienting device through which a properly oriented article feeds directly when said orienting device is in a first state, said orienting device being movable from a second state in which it receives a misoriented article, to the first state, to orient the misoriented article;
feeding means for feeding the articles along a predetermined path to said orienting device;
sensing means positioned along the predetermined path of movement of the articles in advance of said orienting device for sensing the orientation of the articles;
means responsive to said sensing means for moving said orienting device to its second state only when an article is misoriented; and
means operable after the misoriented article has fed to said orienting device in its second state, for moving said orienting device to its first state to orient the article and so that the then oriented article feeds from said orienting device.

2. Apparatus for orienting articles, which comprises:
a rotatable cylinder having an article receiving bore through which a properly oriented article feeds directly when said cylinder is in a first position, said cylinder being rotatable from a second position in which it receives a misoriented article, to the first position, to orient the misoriented article;
feeding means for feeding the articles along a predetermined path into the bore in said cylinder when said cylinder is in either its first position or its second position;
sensing means positioned along the predetermined path of movement of the articles in advance of said cylinder for sensing the orientation of the articles;
means responsive to said sensing means for rotating said cylinder to its second position only when an article is misoriented;
means for preventing the misoriented article from feeding out of the bore in said cylinder when said cylinder is in its second position; and
means operable after the misoriented article has fed into the bore in said cylinder, for rotating said cylinder from its second position to its first position, to orient the article and so that the then oriented article feeds from the bore in said cylinder.

3. Apparatus for orienting articles, which comprises:
a cylinder having an article receiving bore extending therethrough;
a sleeve member encircling said cylinder, said cylinder and said sleeve member being relatively rotatable and having first relative positions in which a properly oriented article feeds directly through openings in said sleeve member and the bore in said cylinder, and having second relative positions in which a misoriented article feeds through one of the openings in said sleeve member into the bore in said cylinder and is prevented from passing through said cylinder by said sleeve member;
feeding means for feeding the articles along a predetermined path to said sleeve member and said cylinder;
sensing means positioned along the predetermined path of movement of the articles in advance of said sleeve member and said cylinder for sensing the orientation of the articles;
means responsive to said sensing means for causing relative rotation of said cylinder and said sleeve member from their first relative positions to their second relative positions when an article is misoriented; and
means operable after a misoriented article has fed through the one opening in said sleeve member into the bore in said cylinder for causing relative rotation of said cylinder and said sleeve member back to their first relative positions, to orient the article and to permit the oriented article to feed from the bore in said cylinder through one of the openings in said sleeve member.

4. Apparatus for orienting articles, which comprises:
a rotatable cylinder having an article receiving bore extending therethrough;
a rotatable sleeve member encircling said cylinder, said cylinder being rotatable relative to said sleeve member, said cylinder and said sleeve member being rotatable into first relative positions in which openings in said sleeve member are aligned with opposite ends of the bore through said cylinder such that a properly oriented article feeds directly through the openings in said sleeve member and the bore in said cylinder, and said cylinder and said sleeve member being rotatable into second relative positions in which one of the openings in said sleeve member is aligned with one end of the bore through said cylinder and said sleeve member closes the opposite end of the bore so that a misoriented article feeds through the one opening in said sleeve member into the bore in said cylinder but does not pass through said cylinder;
pin and slot means for limiting rotation of said cylinder relative to said sleeve member and for subsequently causing rotation of said sleeve member with said cylinder such that said cylinder and said sleeve member move from their first relative positions into their second relative positions upon rotation of said cylinder in one direction, and move back into their first relative positions upon rotation of said cylinder in the opposite direction;
feeding means for feeding the articles along a predetermined path to said sleeve member and said cylinder;
sensing means positioned along the predetermined path of movement of the articles in advance of said sleeve member and said cylinder for sensing the orientation of the articles;
means responsive to said sensing means for rotating said cylinder in the one direction to move said cylinder and said sleeve member from their first relative positions to their second relative positions when an article is misoriented; and
means operable after a misoriented article has fed through the one opening in said sleeve member into the bore in said cylinder, for rotating said cylinder in the opposite direction to move said cylinder and said sleeve member back to their first relative positions, thereby to orient the article and to permit the oriented article to feed from the bore in said cylinder through the other opening in said sleeve member.

5. Apparatus for orienting articles, as recited in claim 4, which further comprises stop means for preventing rotation of said sleeve member relative to said cylinder when said cylinder and said sleeve member are in their first and second relative positions.

References Cited by the Examiner
UNITED STATES PATENTS
2,997,202  8/1961  Madeux _____ 221—9

References Cited by the Applicant
UNITED STATES PATENTS
2,836,324  5/1958  Willis et al.
2,845,164  7/1958  Stahl.

EVON C. BLUNK, *Primary Examiner.*

E. A. SROKA, *Assistant Examiner.*